(12) United States Patent
Combs, II

(10) Patent No.: US 6,497,445 B1
(45) Date of Patent: Dec. 24, 2002

(54) HARD TONNEAU COVER WITH CONCEALED EXTERIOR LATCH HANDLE

(75) Inventor: Robert B. Combs, II, Olathe, KS (US)

(73) Assignee: Astro Cap Manufacturing West, Inc., Garnett, KS (US)

( * ) Notice: Subject to any disclaimer, the term of this patent is extended or adjusted under 35 U.S.C. 154(b) by 0 days.

(21) Appl. No.: 10/034,651

(22) Filed: Dec. 27, 2001

(51) Int. Cl.⁷ .................................................. B60P 7/02
(52) U.S. Cl. .............................. 296/100.07; 296/100.06
(58) Field of Search ....................... 296/100.06, 100.07, 296/100.08, 100.09, 100.1; 16/110.1; 49/460; 292/341.14

(56) References Cited

U.S. PATENT DOCUMENTS

| | | | |
|---|---|---|---|
| 3,926,334 A | * 12/1975 | Key | |
| 4,450,695 A | * 5/1984 | Graziano | |
| 4,762,360 A | * 8/1988 | Huber | |
| D403,292 S | 12/1998 | Borard | |
| 6,042,173 A | 3/2000 | Nett | |
| 6,076,881 A | 6/2000 | Tucker | |
| 6,129,407 A | 10/2000 | Kooiker | |
| 6,221,290 B1 | 4/2001 | Waddington et al. | |
| 6,254,169 B1 | 7/2001 | Arthur | |
| 6,343,828 B1 | * 2/2002 | Young et al. | ............ 296/100.1 |

OTHER PUBLICATIONS

Internet sales literature of Leer, Inc., at www.leer.com/tonneau.html, exact publication date unknown, but at least one year prior to the filing of the present application.
Internet sales literature of SNUGTOP Custom Fibreglass Manufacturing Co., at www.snugtop.com/p_smuglid.htm, exact publication date unknown, but at least one year prior to the filing of the present application.

* cited by examiner

Primary Examiner—Joseph D. Pape
(74) Attorney, Agent, or Firm—Kent R. Erickson; Shughart Thomson & Kilroy P.C.

(57) ABSTRACT

A substantially rigid tonneau cover is provided which is hingedly connectable to a truck bed and moveable between open and closed positions. A latch mechanism mounted on the interior surface of the cover is selectively engagable with the truck bed to secure the cover in the closed position. A latch release handle is mounted in a recessed compartment formed on the exterior surface of the cover and is connected to the latch mechanism. A hatch is connected to the cover proximate the latch handle and is moveable between a hatch open position and a hatch closed position. In the hatch closed position the hatch covers the recessed compartment and the latch release handle mounted therein. The hatch is preferably mounted such that in the hatch closed position the exterior surface of the hatch is generally flush with exterior surface of the cover and conforms to the contour of the cover.

16 Claims, 3 Drawing Sheets

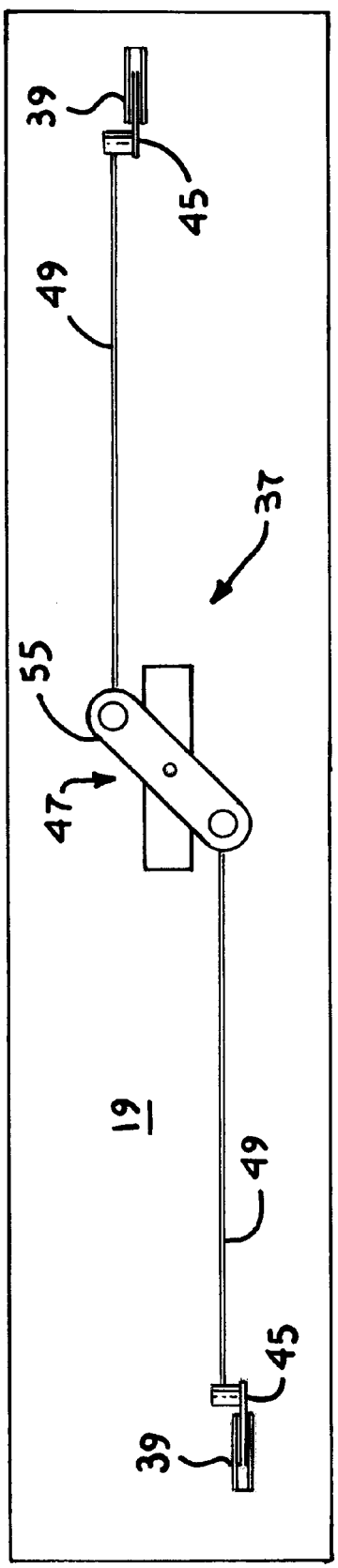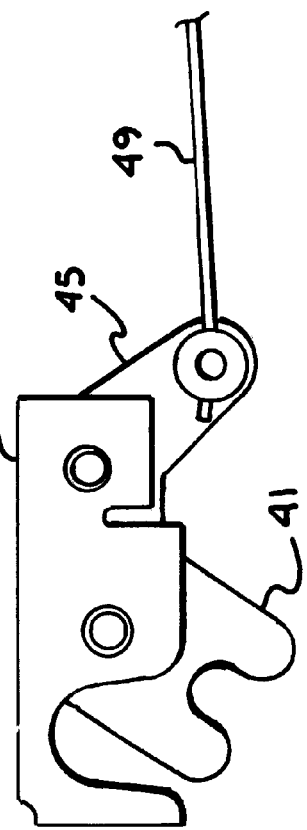

HARD TONNEAU COVER WITH CONCEALED EXTERIOR LATCH HANDLE

BACKGROUND OF THE INVENTION

1. Field of the Invention

This invention relates to tonneau covers for pickup truck beds, and in particular to a hard tonneau cover having an exterior latch handle concealed and protected by a hatch.

2. Description of the Related Art

Pickup trucks are popular because of their utility in transporting relatively large articles, in towing various types of trailers, and in general transportation. The open beds of pickup trucks are useful for carrying articles generally much larger than can be fitted into conventional automobiles. However, pickups used for everyday transportation are seldom required to haul very large objects. In these applications, the openness of the bed presents security problems for articles carried in the bed and subjects them to weather. Additionally, the bed sidewalls and tailgate of the truck create aerodynamic drag which lowers fuel efficiency at highway speeds.

In order to overcome these problems, structures such as bed covers or "tonneau covers" have been developed to enclose the top of pickup truck beds. Tonneau covers are available in both soft and hard types. Soft tonneau covers generally comprise a piece of flexible material, such as canvas, which is stretched across the top of the bed and secured to the bed walls. Many different means have been developed for securing these soft covers to the bed. Hard tonneau covers generally comprise a lid of fiberglass, metal, plastic or other rigid material which is hingedly or pivotally mounted with respect to the bed.

The majority of hard tonneau covers are formed as a single unit which is hingedly connected to the front wall of the pickup bed and which latches proximate the tailgate. The cover is opened by releasing a latch and lifting the rear of the cover. Telescoping struts or braces are generally provided for assisting in the lifting of the cover and for retaining it in the open position. Other variations on the hard tonneau cover have the cover divided either laterally or longitudinally into multiple sections. An example of a laterally divided hard tonneau cover having two halves hingedly connected to one another is disclosed by U.S. Pat. No. Des. 403,292. A longitudinally divided hard tonneau cover having the two halves hingedly connected to respective bed sidewalls is disclosed by U.S. Pat. No. 6,254,169.

With any hard tonneau cover, one or more latches must be provided for retaining the cover in a closed position. Some tonneau covers utilize latches mounted entirely inside the truck bed which can only be accessed by first opening the truck's tailgate. Tonneau covers with this type of latch are disclosed by U.S. Pat. Nos. 6,042,173 and 6,076,881. This type of latch design is cosmetically attractive because all of the latch mechanism is hidden when the cover is closed, however, the latches may be difficult to reach, especially if the truck bed is fully loaded.

More typically, tonneau covers are provided with an exterior latch handle which is connected to a latch mechanism mounted on the underside of the cover. The latch mechanism selectively engages a pair of catches, each of which is mounted on a respective one of the bed side walls. An example of a tonneau cover with such an exterior latch handle is disclosed by U.S. Pat. No. 6,221,290. With this type of design, the latch handle is easier to reach, making the cover easier to open, however the exterior latch handle is not especially attractive and detracts from the appearance of the tonneau cover. In addition, the exterior latch handle is exposed to weather. During the winter months, ice may accumulate on the latch handle and make it difficult or impossible to operate. Water and road salt may also degrade components of the latch.

What is needed is a latch design for a tonneau cover which combines the smooth appearance and weather resistance of an interior mounted latch with the convenience and ease of operation of the exterior latch handle.

SUMMARY OF THE INVENTION

The tonneau cover assembly of the present invention comprises a substantially rigid cover having a latch mechanism mounted on its interior surface. The latch mechanism is selectively engagable with the truck bed to secure the cover in a closed position. A latch release handle is mounted in a recessed compartment formed on the exterior surface of the cover and is connected to the latch mechanism. A hatch is connected to the cover proximate the latch handle and is moveable between a hatch open position and a hatch closed position. In the hatch closed position the hatch covers the recessed compartment and the latch release handle mounted therein. The hatch is preferably mounted such that in the hatch closed position the exterior surface of the hatch is generally flush with exterior surface of the cover and conforms to the contour of the cover.

BRIEF DESCRIPTION OF THE DRAWINGS

FIG. 2 is a fragmentary and partially schematic view of an interior surface of the tonneau cover showing the latch mechanism mounted thereon.

FIG. 3 is an enlarged side view of a rotary catch of the latch mechanism of FIG. 2.

DETAILED DESCRIPTION OF THE PREFERRED EMBODIMENT

Figure 1:
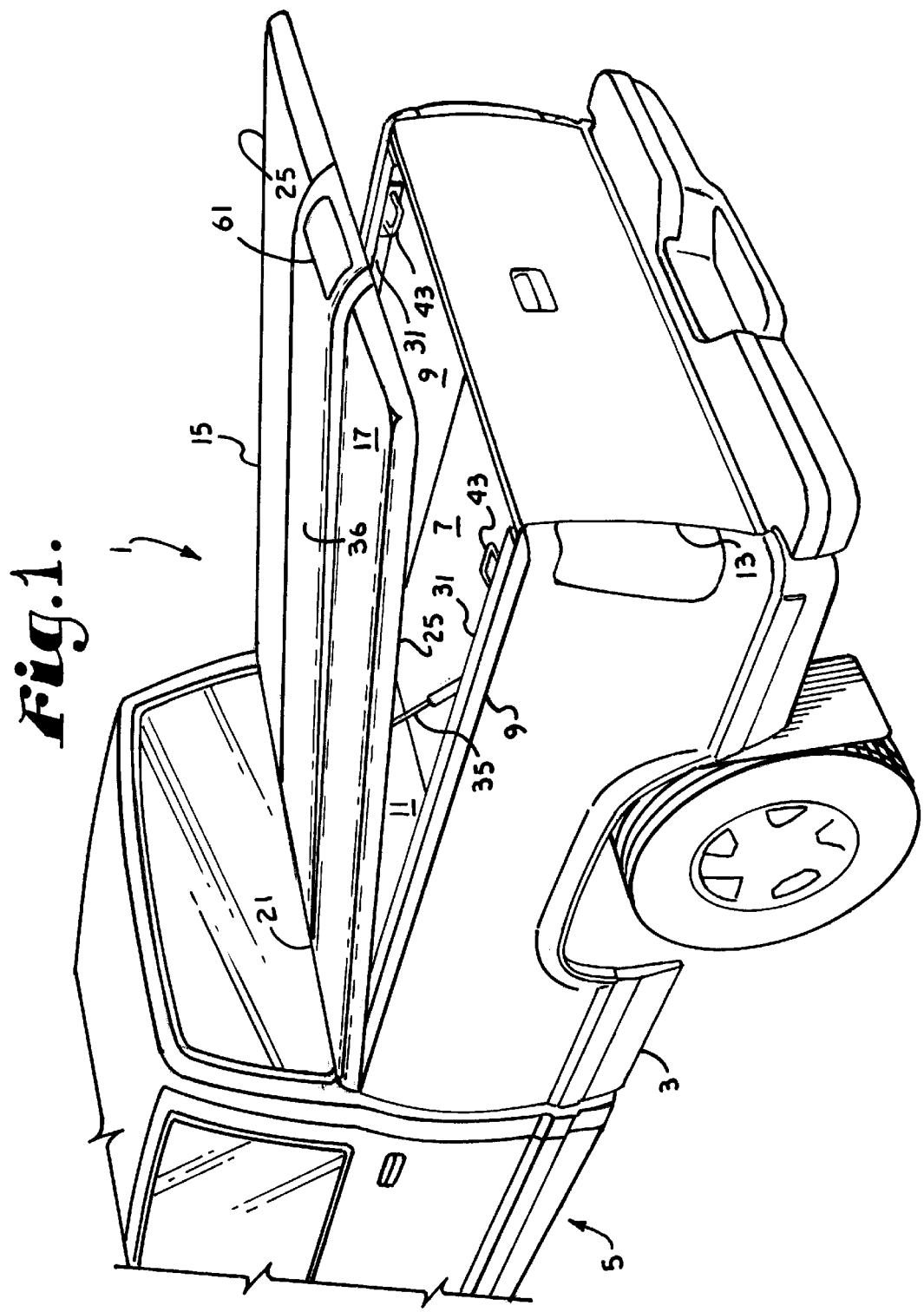
FIG. 1 is a fragmentary perspective view of a pickup truck having a tonneau cover embodying the present invention installed thereon. The tonneau cover is shown in a partially open position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

Referring to the drawings in more detail, and in particular to FIG. 1, the reference number 1 generally designates a tonneau cover assembly which embodies the present invention. The tonneau cover assembly 1 is for use in selectively covering the bed 3 of a pickup truck 5, the bed 3 generally comprising a bed floor 7, opposing sidewalls 9, a front wall 11 and a tailgate 13

The cover assembly 1 includes a substantially rigid cover 15 which is hingedly attachable to the bed 3 so as to be moveable between a closed position and an open position. The cover 15 is generally rectangular in shape and includes an exterior surface 17, an interior surface 19, a front edge 21, a rear edge 23 and a pair of side edges 25. The cover 15 is sized such that in its closed position it will abut against upper portions of the sidewalls 9, front wall 1 and tailgate 13. The cover 15 is preferably constructed of fiberglass, however other plastic or composite materials, or metals such as aluminum or steel, could also be used.

The cover 15 is shown as being mounted to the bed 3 using a framework 27 having a pair of side rails 31 which run parallel to the sidewalls 9 and a front rail (not shown) which connects the side rails 31 proximate the front wall 11 of the bed 3. The cover 15 is hingedly connected to the front rail such that the rear edge 23 of the cover 15 may be lifted to move the cover into its open position. A pair of telescopic hydraulic or gas struts 35 are connected between the cover 15 and the side rails 31. The struts 35 aid in raising the cover 15 into its open position and retain the cover in the open position until it is closed by the user.

The cover 15 is shown as having a raised central portion 36 which is integrally molded into the cover 15. The raised central portion 36, while providing some additional clearance for a latch release handle assembly to be described later, is largely cosmetic and is not intended to comprise a necessary part of the present invention.

Referring to FIG. 2, the cover 15 is selectively retained in the closed position by a latch mechanism 37 which includes a pair of slam catches 39 mounted to the interior surface 19 of the cover 15 proximate the side edges 25. The slam catches 39 are shown in FIG. 3 as being rotary catches, each of which has a latching member 41 which is engageable with a respective loop or bail 43 on the adjacent side rail 31 (see FIG. 1) to retain the cover 15 in its closed position. Each slam catch 39 includes a release lever 45 which, when actuated, causes the latching member 41 to release the respective loop 43. Referring again to FIG. 2, the two release. levers 45 are connected to a centrally located latch release handle assembly 47 by respective cables 49.

Figure 4:
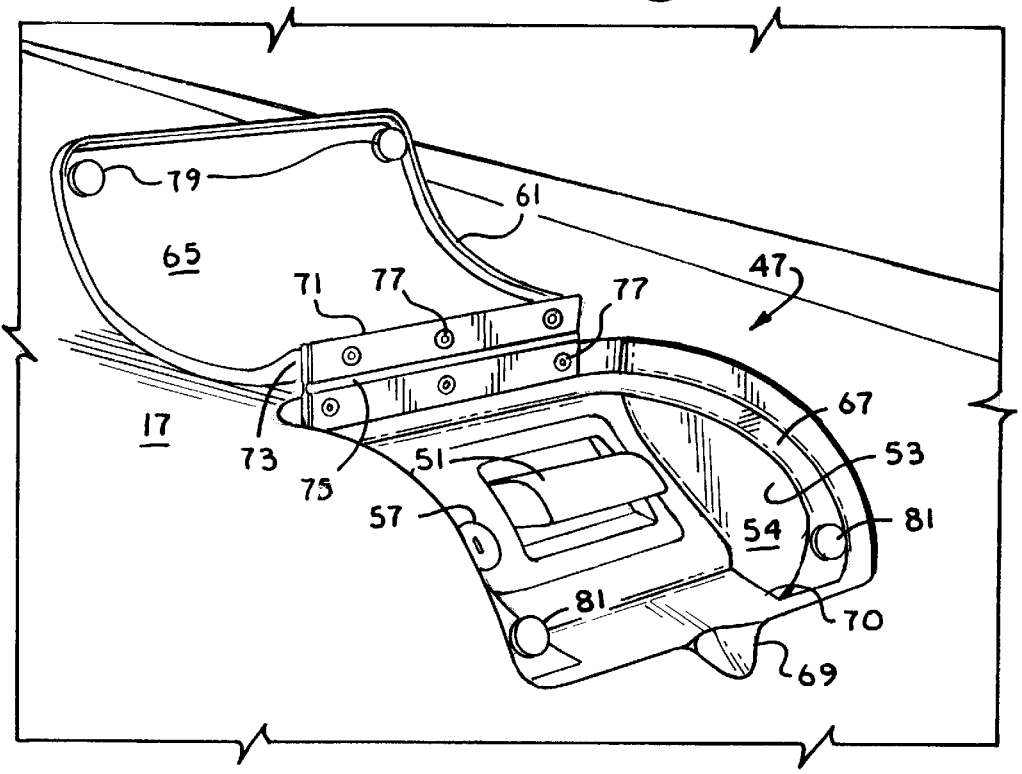
FIG. 4 is a fragmentary perspective view of the tonneau cover with the hatch in the open position showing the latch release handle.

As best seen in FIG. 4, the assembly 47 includes a latch release handle 51 which is accessible from the exterior of the cover 15. The release handle 51 is mounted in a recessed handle compartment 53 formed in the cover 15 and defined by a compartment wall 54 such that the handle 51 lies below or inward from the plane of the cover exterior surface 17. The handle 51 is operatively connected to a rocker 55 (see FIG. 2) having opposing ends which receive the cables 49. When a user grasps the handle 51 and lifts it upwardly, the rocker 55 is rotated, tensioning the cables 49 and thereby releasing the slam catches 39. The latch assembly 47 may also include a lock 57 which, when engaged, prevents the rocker 55 from rotating in response to an actuation of the release handle 51. The lock 57 thereby prevents the cover 15 from being opened and secures any objects being carried in the bed 3.

Figure 5:
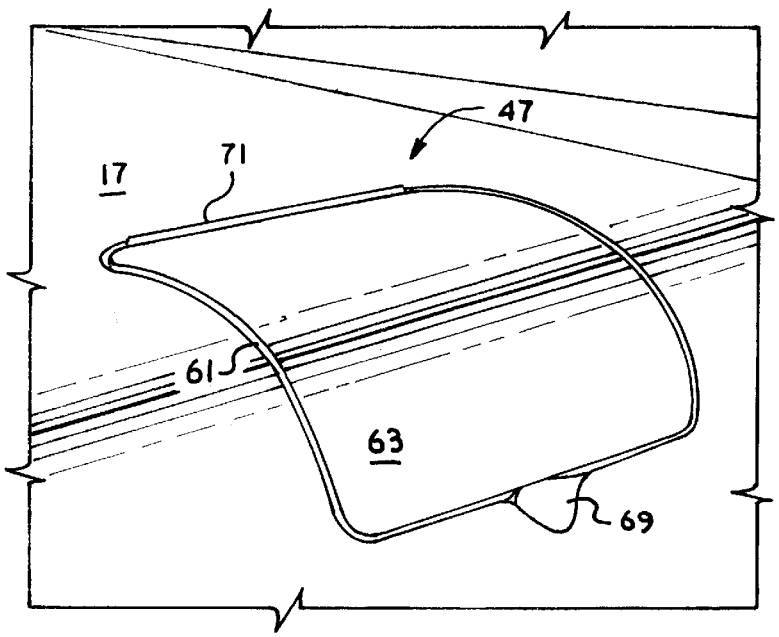
FIG. 5 is a fragmentary perspective view of the tonneau cover with the hatch in the closed position.

Referring to FIGS. 4 and 5, a hatch 61 having an exterior surface 63 and an interior surface 65 is hingedly connected to the cover 15 so as be moveable between a hatch open position (FIG. 4) and a hatch closed position (FIG. 5). In the hatch closed position, the hatch 61 covers the compartment 53 and the release handle 51 mounted therein. The compartment 53 preferably includes a or shoulder ledge 67 which is formed around at least a portion of the periphery of the compartment 53 and which serves as a stop or support surface for the hatch 61. When the hatch 61 is seated against the ledge 67, the exterior surface 63 of the hatch 61 is preferably generally flush with the exterior surface 17 of the cover 15 so as to give a smooth appearance to the cover assembly 1. The surface 63 is, therefore, preferably contoured to match the contour of the surface 17. A finger insertion groove 69 is molded into the cover 15 along a lower shoulder or surface 70 of the compartment 53 to allow a user to insert a finger under the hatch 61 and thereby open the hatch. The lower shoulder 70 is sloped to permit any water which might enter the compartment 53 to drain out along the lower shoulder 70.

The connection between the hatch 61 and the cover 15 is shown in FIG. 4 as being made by a hinge 71 which comprises a strip of elastomeric material 73 having a cross-sectional profile which is narrowed along a fold line 75 to facilitate bending or folding of the strip 73. The hinge 71 is connected to the hatch 61 and cover 15 by conventional means, such as by rivets 77. It is to be understood that other types of hinges 71, such as piano hinges, could be used in place of the elastomeric hinge 73 described. It is also to be understood that the hatch 61 could be slidably or otherwise moveably mounted to the cover 15 in ways other than by use of hinges 71.

The cover assembly 1 includes means for releasably retaining the hatch 61 in the hatch closed position. One such means, shown in FIG. 4, comprises pairs of magnets 79 mounted on the hatch 61 and corresponding pairs of magnets 81 mounted on the ledge 67 of the tonneau cover 15. In the hatch closed position, the magnets 79 engage the magnets 81 to hold the hatch 61 closed. Alternatively, the hatch 61 could be provided with a latch (not shown) which could be locked or unlocked, or remotely operated from inside the truck cab. Such a latch would allow the hatch 61 to be secured in the hatch closed position, impeding access to the release handle 51, and thereby preventing the cover 15 from being opened. If such a latch were used on the hatch 61, the lock 57 previously described as part of the release handle assembly 47 could be eliminated. It is also foreseen that springs (not shown) could be used in association with the hinge 71 to hold the hatch 61 in the open position or to resist opening of the hatch 61.

It is preferable that in the hatch open position, the exterior surface 63 of the hatch 61 not rest against the exterior surface 17 of the cover 15. In the majority of applications these surfaces will be painted, and contact between them could cause the paint to be marred. A limit stop (not shown) could, therefore, be provided to prevent such contact.

It is to be understood that while certain forms of the present invention have been illustrated and described herein, it is not to be limited to the specific forms or arrangement of parts described and shown. For example, while the cover 17 has been shown as being a single molded piece hingedly connected to the bed 3 proximate the front wall 9, the cover 17 may be divided either transversely or longitudinally into sections without changing the nature of the invention. If so divided, the sections may be hinged to one another or to the bed sidewalls 7 instead of to the front wall 9. One or more of such sections would be equipped with a release handle assembly 47 with its attendant hatch 61.

It is also to be understood that the hatch 61 could be used to selectively cover a wide variety of tonneau latch actuating mechanisms or handles, and that a wide variety of latch mechanisms other than the one shown could be used to selectively secure the hatch 61 in a closed position.

What is claimed and desired to be secured by Letters Patent is as follows:

1. A latch handle assembly for a tonneau latch mechanism of a substantially rigid tonneau cover having a selected surface contour, said latch handle assembly comprising:
    a) a compartment wall forming a recessed handle compartment, said wall being connected to said tonneau cover;
    b) a latch release handle mounted on said compartment wall and connected to a tonneau latch mechanism, said latch release handle operable to release the tonneau latch mechanism; and
    c) a hatch having a shape generally conforming to said selected surface contour and connected to said tonneau cover in such a manner as to enable movement of said hatch between a closed position generally conforming to said selected contour and preventing access to said release handle and an open position providing access to said release handle for operation.

2. The latch handle assembly as set forth in claim 1 and including a lock assembly engaged with said latch mechanism and mounted on said compartment wall within said compartment.

3. The latch handle assembly as set forth in claim 1 wherein said hatch is hingedly connected to said tonneau cover.

4. The latch handle assembly as in claim 1 and further including means for selectively retaining said hatch in said closed position.

5. A tonneau cover assembly for enclosing a bed of a pickup truck, comprising:
    a) a substantially rigid cover hingedly connectable to the truck bed and moveable between open and closed positions;
    b) a latch mechanism for selectively securing said cover to the truck bed in said closed position;
    c) a latch release handle mounted on said cover and connected to said latch mechanism, said latch release handle being graspable by a user to release said latch mechanism and allow said cover to be moved to said open position; and
    d) a hatch connected to said cover proximate said latch handle and moveable between a hatch open position and a hatch closed position, said hatch covering said latch release handle in said hatch closed position.

6. The tonneau cover assembly as in claim 5 wherein said latch release handle is mounted in a recessed handle compartment defined by a compartment wall connected to said cover.

7. The tonneau cover assembly as in claim 6 wherein said hatch covers said recessed handle compartment when said hatch is in said hatch closed position.

8. The tonneau cover assembly as in claim 6 wherein said hatch is hingedly connected to said cover.

9. The tonneau cover assembly as in claim 8 wherein said compartment wall includes a ledge around at least a portion of said compartment and said hatch seats against said ledge in said hatch closed position.

10. The tonneau cover assembly as in claim 9 wherein said cover includes a cover exterior surface, said hatch includes a hatch exterior surface, and said hatch exterior surface is generally flush with said cover exterior surface when said hatch is in said hatch closed position.

11. The tonneau cover assembly as in claim 10 and further including means for selectively retaining said hatch in said hatch closed position.

12. The tonneau cover assembly as in claim 11 and further including a lock assembly engaged with said latch mechanism and mounted within said compartment.

13. A tonneau cover assembly for enclosing a bed of a pickup truck, comprising:
    a) a substantially rigid cover hingedly connectable to the truck bed, said cover having a cover interior surface and a cover exterior surface;
    b) a latch mechanism mounted on said cover interior surface and selectively engagable with the truck bed to secure said cover in a closed position;
    c) a latch release handle mounted on said cover and connected to said latch mechanism, said latch release handle being accessible from said cover exterior surface and graspable by a user to release said latch mechanism and allow said cover to be moved to an open position; and
    d) a hatch connected to said cover proximate said latch handle and moveable between a hatch open position and a hatch closed position, said hatch covering said latch release handle in said hatch closed position.

14. The tonneau cover assembly as in claim 13 wherein said hatch is hingedly connected to said cover.

15. The tonneau cover assembly as in claim 13 wherein said hatch includes a hatch exterior surface and said cover includes a recess into which said hatch is received in the hatch closed position such that said hatch exterior surface is generally flush with said cover exterior surface.

16. The tonneau cover as in claim 13 and further including means for selectively retaining said hatch in said hatch closed position.

* * * * *